(12) United States Patent
Stanton

(10) Patent No.: US 6,257,652 B1
(45) Date of Patent: Jul. 10, 2001

(54) SIDE IMPACT STRUCTURE FOR A MASS TRANSIT VEHICLE

(75) Inventor: William H. Stanton, Winnipeg (CA)

(73) Assignee: New Flyer Industries Limited, Winnipeg (CA)

( * ) Notice: Subject to any disclaimer, the term of this patent is extended or adjusted under 35 U.S.C. 154(b) by 0 days.

(21) Appl. No.: 09/497,633

(22) Filed: Feb. 3, 2000

(51) Int. Cl.$^7$ ........................................................ B60J 9/00
(52) U.S. Cl. ............................................ 296/178; 296/191
(58) Field of Search ..................................... 296/178, 191

(56) References Cited

U.S. PATENT DOCUMENTS

| | | | |
|---|---|---|---|
| 4,469,369 | * | 9/1984 | Belik et al. ....................... 296/178 X |
| 4,964,671 | * | 10/1990 | Millar ................................... 296/178 |
| 5,140,913 | * | 8/1992 | Takeichi et al. .................. 296/191 X |
| 5,685,229 | * | 11/1997 | Ohara et al. ...................... 296/191 X |

* cited by examiner

Primary Examiner—Dennis H. Pedder
Assistant Examiner—Lori L. Coletta
(74) Attorney, Agent, or Firm—Adrian D. Battison

(57) ABSTRACT

A public transit vehicle has a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows. The floor includes a bottom frame including two side rails. Each side wall includes a plurality of longitudinally space vertical posts attached at the bottom to the side rail. A metal shear plate with wave form stiffening is welded between each pair of posts and at its bottom edge to the side rail and extends upwardly to a top edge spaced downwardly from the windows and acts as an impact plate to prevent penetration. Exterior cladding for the side wall includes a continuous panel connected along the side under the window and a plurality of end to end sacrificial flexible impact panels connected to the continuous panel by a hinge joint at an upper edge of the impact panels so as to cover the impact plate.

34 Claims, 7 Drawing Sheets

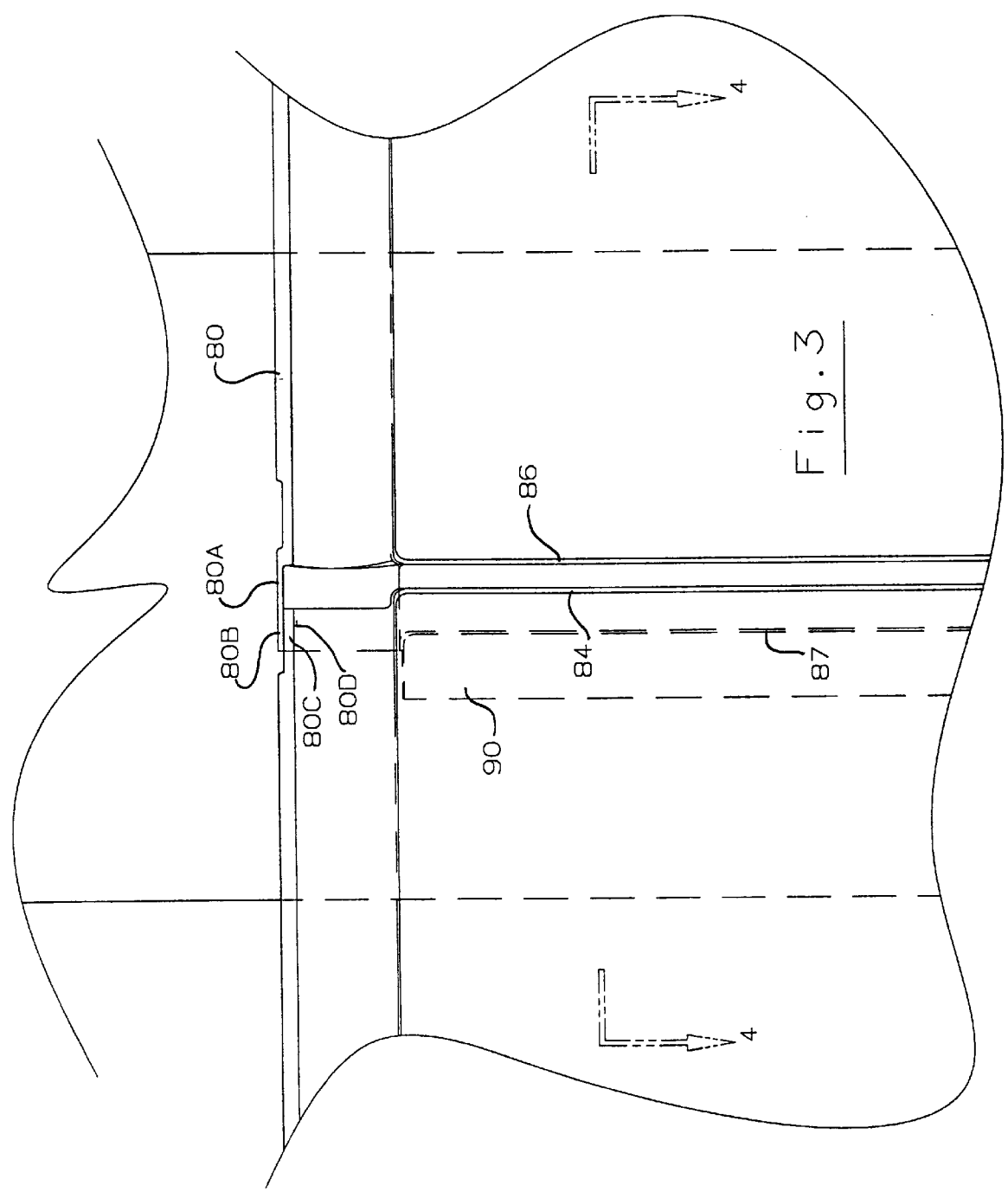

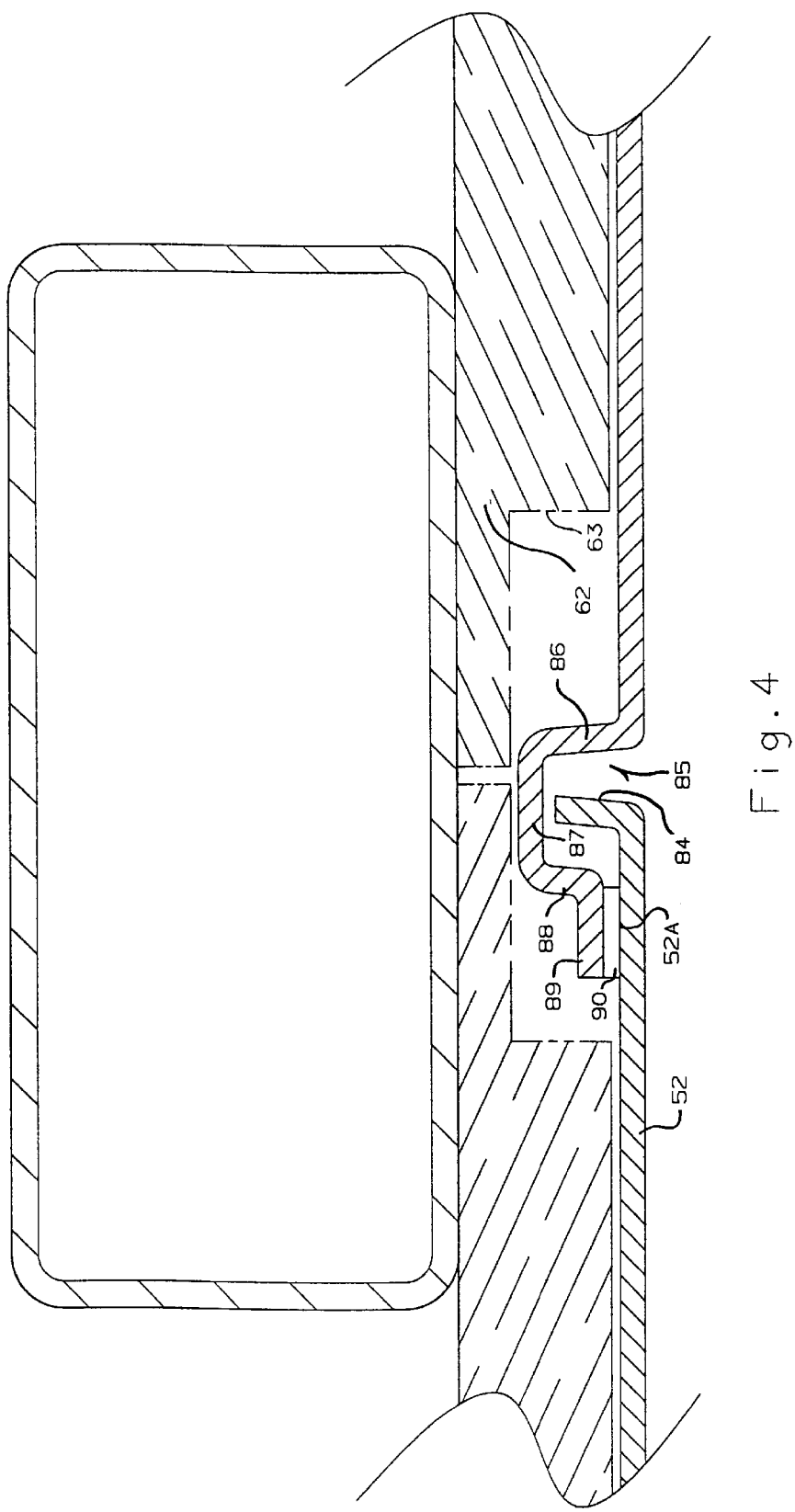

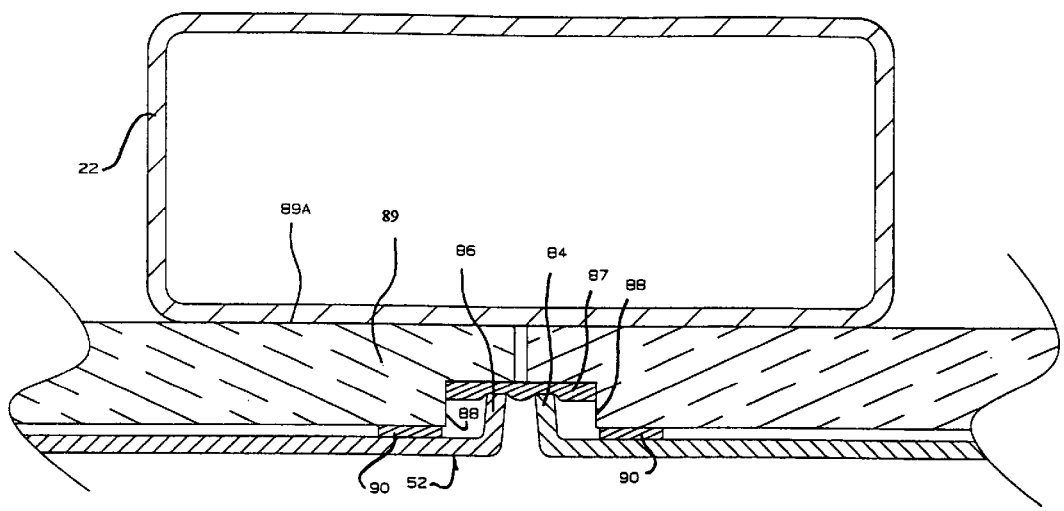
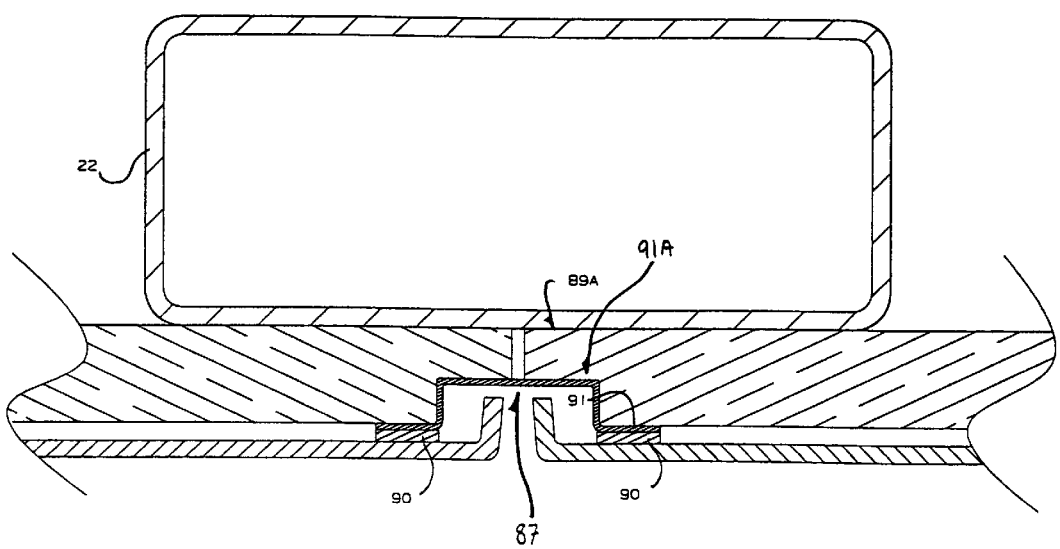

SIDE IMPACT STRUCTURE FOR A MASS TRANSIT VEHICLE

This invention relates to side impact arrangement for a passenger area of a mass transit vehicle.

This application is related to a series of four further applications all filed simultaneously with this application and assigned to the same assignee as follows:

Application Ser. No. 09/496,686 filed Feb. 3, 2000 and entitled Interior Structure of a Mass Transit Vehicle;

Application Ser. No. 09/497,634 filed Feb. 3, 2000 and entitled Passenger Lighting System for Mass Transit Vehicle;

Application Ser. No. 09/496,684 filed Feb. 3, 2000 and entitled Body Structure of Mass Transit Vehicle;

Application Ser. No. 09/496,685 filed Feb. 3, 2000 and entitled Window Structure for Mass Transit Vehicle.

The disclosures of the above applications are incorporated herein by reference.

BACKGROUND OF THE INVENTION

Conventionally for many years buses are fabricated from a steel welded frame which is clad externally by sheets of aluminum or similar non-elastic cladding material bolted or riveted side by side over the steel frame. The interior surface is similarly clad by sheets of suitable material again attached to the steel frame. Insulation material is added as pieces inserted simply between the components of the frame and the interior and exterior cladding.

While a vehicle of this structure is relatively strong and resistant to impact damage, should a significant impact occur, there is a danger of penetration from the exterior through the interior cladding leaving a hole which can expose the passengers to danger. Any such perforated structure, even though it can in many cases still be driven cannot legally carry passengers and therefore must immediately be taken out of service.

In addition the repairs to the structure cannot be effected in the field and are relatively expensive since the individual panels must be replaced in a relatively time consuming operation at a service facility.

SUMMARY OF THE INVENTION

It is one object of the present invention, therefore, to provide an improved public transit vehicle having improved impact and cladding arrangements.

According to a first aspect of the invention there is provided a public transit vehicle comprising:

a vehicle body having:

a roof, two side walls each extending longitudinally of the vehicle including an upper side wall portion connecting to the roof and a row of windows underneath the upper portion, a vehicle floor connected to the side walls and spanning therebetween;

two rows of seats for seated passengers each along a respective one of the side walls at the windows and defining a central aisle therebetween for standing and moving passengers;

and a vehicle frame for supporting the vehicle body, the frame comprising:

a bottom frame portion having a plurality of longitudinal bottom rails underlying and supporting the floor including two bottom side rails each along a respective side of the floor at the respective side wall;

and two side frame portions;

each side frame portion having a plurality of side wall posts connected to a respective one of the bottom side rails and upstanding therefrom;

and each side frame portion including a shear plate member welded along its bottom edge to the bottom side rail and to the side wall posts so as to extend continuously therebetween and extending continuously upwardly from the bottom edge to a top edge spaced downwardly from a bottom edge of the window, the shear plate member being formed with a plurality of horizontal stiffening elements therein so as to be resistant to impact thereon in a collision;

each side wall including an exterior cladding structure including a resilient covering panel member covering at least a part of an outer surface of the shear plate member.

Preferably the stiffening elements in the shear plate member are defined by horizontally extending vertically spaced bends in the plate member.

Preferably the shear plate member between each pair of posts comprises a single plate welded at its bottom edge to the bottom side rail and standing generally upwardly therefrom to form a generally vertical plate surface, at least one recessed band in the plate surface defined by four parallel horizontal bends and a top recessed channel portion defined by four parallel horizontal bends.

Preferably said at least one band is shallower in horizontal depth than the channel.

Preferably the exterior cladding structure includes a plurality of resilient covering panel members arranged side by side along the length of the side wall.

Preferably each of the resilient covering panel members is mounted at its upper edge by a hinge coupling defined by a part cylindrical insert received within a part cylindrical recess allowing the resilient covering panel member to be pivoted from a vertical covering position to a raised removal position at which it can be removed from the cladding structure and wherein the part cylindrical insert of each of the resilient covering panel members overlaps with that of the next and is reduced in thickness at the overlap.

Preferably the resilient covering panel members each include along each side edge thereof an edge sealing member for engaging and effecting sealing engagement with an underlying sealing strip, the side edge of each panel member being adjacent to and spaced from that of the next panel to allow removal of each panel member without affecting the next panel members.

Preferably the edge sealing member of each resilient covering panel members comprises a rearwardly turned flange having a rearmost edge surface for engaging the sealing strip and a resilient sealing bead on a rear surface of the panel member adjacent the flange.

Preferably the exterior cladding structure includes a cladding panel above the top edge of the resilient covering panel and below the bottom edge of the windows.

Preferably the cladding panel is substantially continuous along the vehicle.

Preferably the resilient covering panel member is mounted at its upper edge by a hinge coupling defined by a part cylindrical insert received within a part cylindrical recess allowing the resilient covering panel member to be pivoted from a vertical covering position to a raised removal position at which it can be removed from the cladding structure.

Preferably the part cylindrical recess is provided on the cladding panel.

Preferably the part cylindrical recess is tapered toward a bottom end to compress the part cylindrical insert in the vertical covering position.

Preferably the part cylindrical recess is defined on its concave side by a generally cylindrical bead member.

Preferably the part cylindrical recess and the part cylindrical inset are arranged such that rotation to the raised removal position tends to cause the insert to be levered out of the recess.

Preferably there is provided a layer of foam insulation carried between the shear plate and the resilient covering panel member.

Preferably the resilient covering panel member is connected by a plurality of spaced fasteners to the bottom side rail.

Preferably the bottom side rail includes a recessed surface below the bottom of the shear plate member and wherein the resilient covering panel member includes an in-turned bottom portion for fastening to the recessed surface.

According to a third aspect of the invention there is provided a public transit vehicle comprising:
  a vehicle body having:
  a roof,
  two side walls each extending longitudinally of the vehicle including an upper side wall portion connecting to the roof and a row of windows underneath the upper portion,
  a vehicle floor connected to the side walls and spanning therebetween;
  two rows of seats for seated passengers each along a respective one of the side walls at the windows and defining a central aisle therebetween for standing and moving passengers;
  each side wall including an exterior cladding structure including a resilient covering panel member covering at least a part of an outer surface of the side wall;
  wherein the resilient covering panel member is mounted at its upper edge by a hinge coupling defined by a part cylindrical insert received within a part cylindrical recess allowing the resilient covering panel member to be pivoted from a vertical covering position to a raised removal position at which it can be removed from the cladding structure.

According to a fourth aspect of the invention there is provided a public transit vehicle comprising:
  a vehicle body having:
  a roof,
  two side walls each extending longitudinally of the vehicle including an upper side wall portion connecting to the roof and a row of windows underneath the upper portion,
  a vehicle floor connected to the side walls and spanning therebetween;
  two rows of seats for seated passengers each along a respective one of the side walls at the windows and defining a central aisle therebetween for standing and moving passengers;
  each side wall including an exterior cladding structure including:
  a plurality of resilient covering panel members arranged side by side along the length of the side wall covering a part of an outer surface of the side wall;
  and a cladding panel which is substantially continuous along the vehicle above the top edge of the resilient covering panels and below the bottom edge of the windows.

BRIEF DESCRIPTION OF THE DRAWINGS

One embodiment of the invention will now be described in conjunction with the accompanying drawings in which:

FIG. 3 is a cross sectional view taken on the lines 3—3 of FIG. 2 at a joint between two of the impact panels on an enlarged scale.

FIG. 4A is a cross sectional view taken on the lines 4—4 of FIG. 3 on a further enlarged scale showing one alternative arrangement for sealing between two adjacent panel edges.

FIG. 4B is a cross sectional view taken on the lines 4—4 of FIG. 3 on a further enlarged scale showing a second alternative arrangement for sealing between two adjacent panel edges.

DETAILED DESCRIPTION

Figure 1:
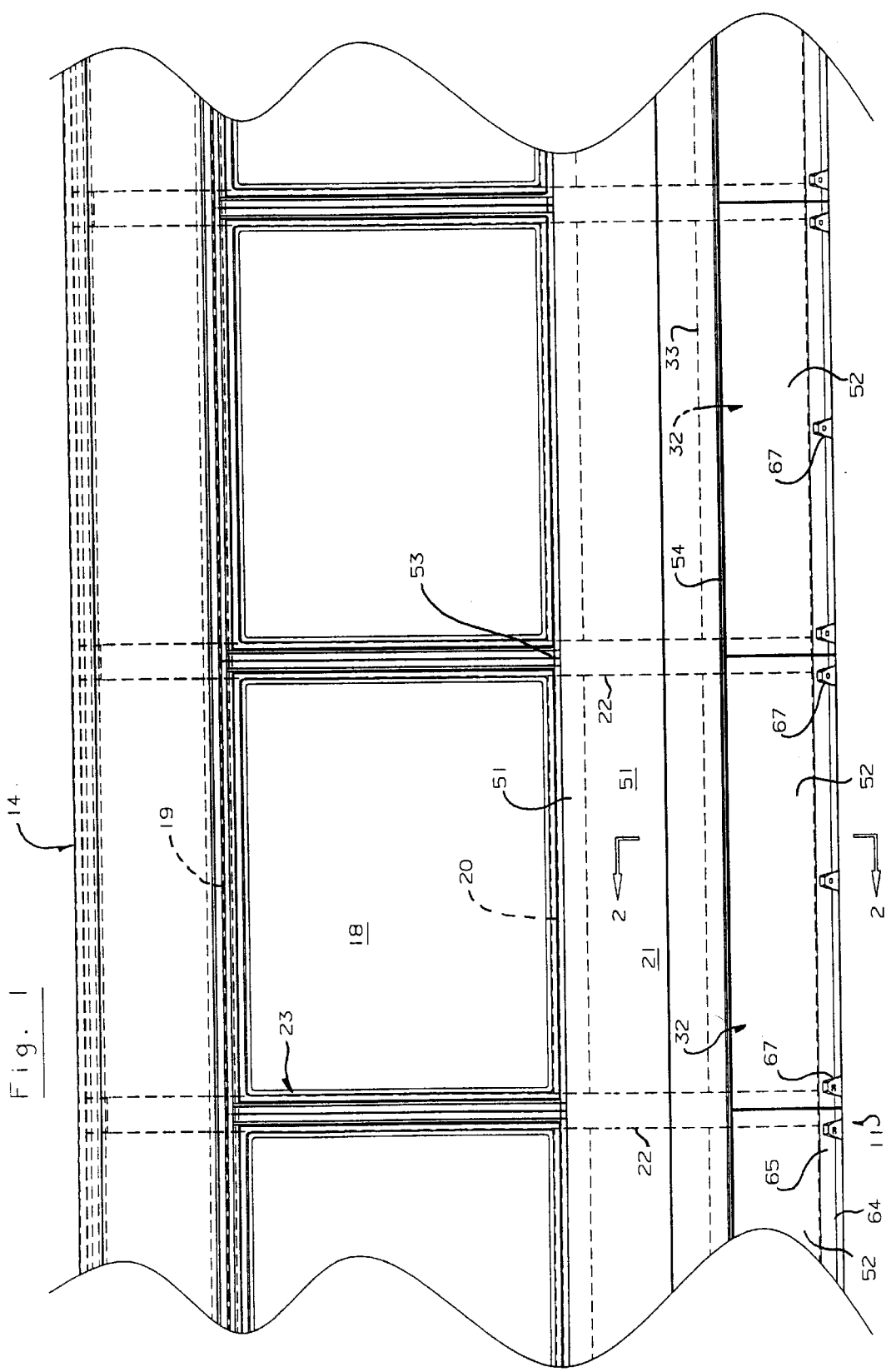
FIG. 1 is a side elevational view of a public transit vehicle according to the present invention.
Figure 2:
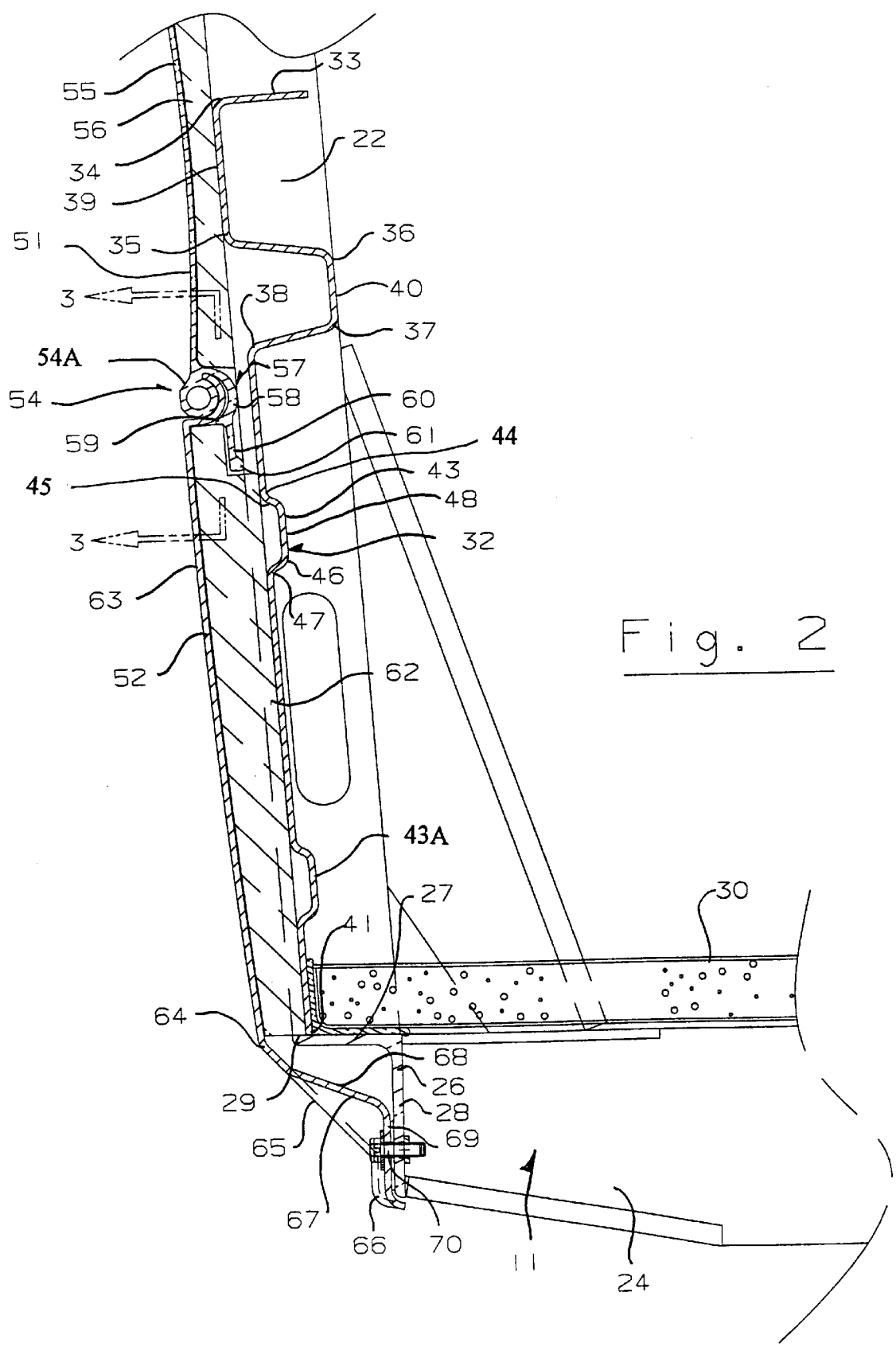
FIG. 2 is a cross sectional view taken on the lines 2—2 of FIG. 1.
Figure 6:
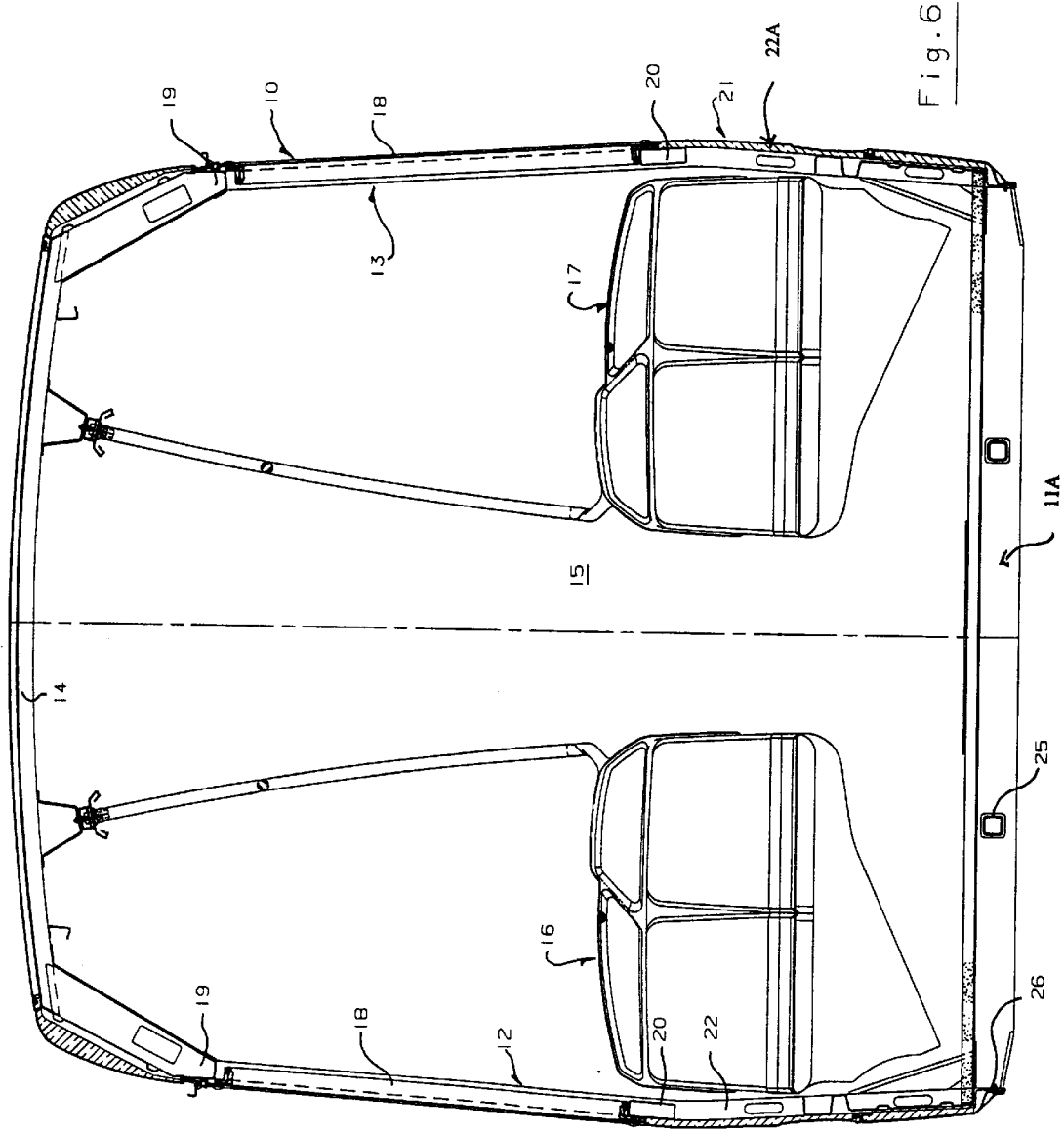
FIG. 6 is a transverse cross section of the vehicle of FIG. 1 showing the general construction.

One side wall and an adjacent portion of the floor are shown in FIGS. 1 and 2 of a vehicle for transporting passengers the general construction of which is shown in FIG. 6.

The vehicle 10 comprises a floor 11, side walls 12 and 13 and a roof structure 14. The vehicle includes a central aisle 15 between two rows 16 and 17 of passenger seats. Each side wall includes a row of windows 18 commencing at a top rail 19 and extending downwardly to an intermediate rail 20. Beneath the windows the side wall is closed to define a closed cladded section 21.

The side wall structure further includes side frame 22A defined by the rails 19, 20 and a plurality of vertical posts 22 at positions longitudinally of the side wall and extending from the floor structure 11 to the rail structure 19. The window openings are thus defined between the rail structure 19 and the rail 20 and in between the posts 22 and a window frame arrangement is inserted into the window opening so defined as indicated generally at 23. The window frame structure from the subject matter of one of the co-pending applications identified above and therefore its structure will not be described herein in detail. The disclosure of the above mentioned application is incorporated herein by reference.

The floor structure 11 as best shown in FIG. 2 includes a bottom frame 11A which comprises a plurality of transverse beams 24 and a plurality of longitudinal rails 25 and 26. The rails 26 are arranged at the side so as to be at the respective side wall and the posts 22 are welded to the side rail 26 so as to stand substantially vertically upwardly therefrom. Each side rail 26 comprises an angle defined by a horizontal flange 27 and a vertical flange 28 with the vertical flange spaced inwardly from an outermost edge 29 of the flange 27. The width of the flange 27 is substantially equal to that of the post or slightly larger than that of the post to allow effective welding to the post.

A floor sheet 30 is applied over the rails 25 and 26 and the beams 24. The floor construction is described in another of the above mentioned co-pending applications and is therefore not described herein in detail.

Each side wall further includes as a structural element thereof a plurality of shear plate members extending from each post to the next adjacent post and extending from the side rail 26 to a position spaced upwardly from the side rail 26 and spaced downwardly from the rail 20 of the side wall. The shear plate members 32 are formed from a continuous sheet of metal so as to extend continuously from one post to the next and so as to extend continuously from the side rail 26 to a top edge 33 of the sheer plate. The sheer plate is formed with a series of horizontally extending, vertically spaced bends to provide stiffening strength to the sheer plate. The shear plate members are seal welded along each side edge to the respective post and along the bottom edge to the flangle 27 of the rail 26.

At the top edge 33, the shear plate member is bent back and forth by a series of bends 34, 35, 36, 37 and 38 so as to define an S-shape defining two channel portions 38A, 38B with two vertical portions 39 and 40 spaced by the width of the post and welded to the post so as to form in effect a rail section at the top of the shear plate. From the bend 38, the shear plate extends downwardly along the outside surface of the post to the bottom edge 41 which is welded to the flange 27. At two or more positions along the height of the plate portion thus formed between the bend 38 and the flange 27 is provided stiffening members defined by recessed sections bands 43 and 43A. Each recessed band is defined by four bends 44, 45, 46 and 47 so as to define a vertical plate section 48 parallel to the main plate section but recessed therefrom. The depth of the recess to the vertical plate section 48 is less than the width of the rail section defined at the top of the plate that is less than the width of the post.

The plate is thus fully closed and from the fully closed section or skirt extending upwardly from the side rail 26 to the top edge 33 which is located in the potential impact zone. The structure therefore defined by the side rails, the posts and the shear plate members ensures that the frame structure of the side wall cannot be penetrated by an impact of the type which can normally be expected with transit buses of this type. While the side frame structure may be deformed if the impact is sufficiently forceful, penetration is extremely unlikely unless the welding of the shear plate members to the frame elements is torn or the plate itself is penetrated. The height of the shear plate member is therefore arranged so as to ensure that it covers the zone which is most likely to receive the impact, that is it is equal to the mean height from the ground of bumpers which are commonly used on sport utility vehicles or light trucks. The shear plate member is formed from 7 gauge steel which again is sufficiently strong to accommodate normally expected impacts.

This structure thus formed by the side wall is covered by the cladding 21. The cladding section comprises an upper cladding panel 51 and a plurality of lower resilient covering panels 52. The cladding panel 51 is continuous along the length of the side wall and extends from a top edge 53 at the window opening to hinge 54A at a bottom edge 54 at a position just below the top edge 33 of the sheer plate 32. The top edge 53 is located underneath an edge of the window frame structure and this aspect is described in detail in one of the above co-pending applications, the disclosure of which is incorporated herein by reference.

The cladding panel 51 is formed by pultrusion from a fibre reinforced resin material and thus defines a relatively thin sheet 55. On an inside surface of the sheet is carried a layer 56 of an insulation material and this insulation material is bonded by an elastomeric adhesive to the inside surface so as to be carried thereby. An elastomeric adhesive takes up any relative movement due to differences in coefficient of thermal expansion between the pultrusion and the insulation material.

At the lower end, the panel 51 includes a mounting flange 57. The mounting flange has a first part cylindrical portion 58 commencing at the bottom of the insulation 56 and extending therefrom toward the shear plate 32. The portion 58 then curves around so as to lie generally parallel to the shear plate 32 thus defining a lip 59 and an attachment flange 60. The attachment flange 60 has an end lip 61 engaging the outer face of the post 22 and defining a recess underneath the flange 60 for receiving an elastomeric adhesive holding the panel 51 in place.

A further layer of insulation 62 is attached onto the shear plate 32 between the flange 60 and extending therefrom to the bottom of the shear plate 32. Thus the insulation layer 62 tapers so that it reduces in thickness down to the bottom edge 41 of the sheer plate 32. The panels 52 are thus free from insulation material carried thereby.

The panels 52 are attached to the continuous panel 51 at the part cylindrical portion 58 and extend therefrom downwardly to an apex 64 at which the panels are bent to define an inwardly and downwardly inclined portion 65 and a bottom lip 66 which engages under the bottom edge of the flange 28 of the rail 26.

In spaced positions along the length of the inclined portion 65, the panel is deformed inwardly to form a pocket 67 with an upper wall portion 68 which extends inwardly at a shaper angle than the inclined portion 65 and a vertical section 69 which lies flat against the flange 28. A fastener 70 extends through the vertical portion 69 and the flange 28 to hold the bottom edge of the panel 52 removably fastened to the rail 26.

Figure 5:
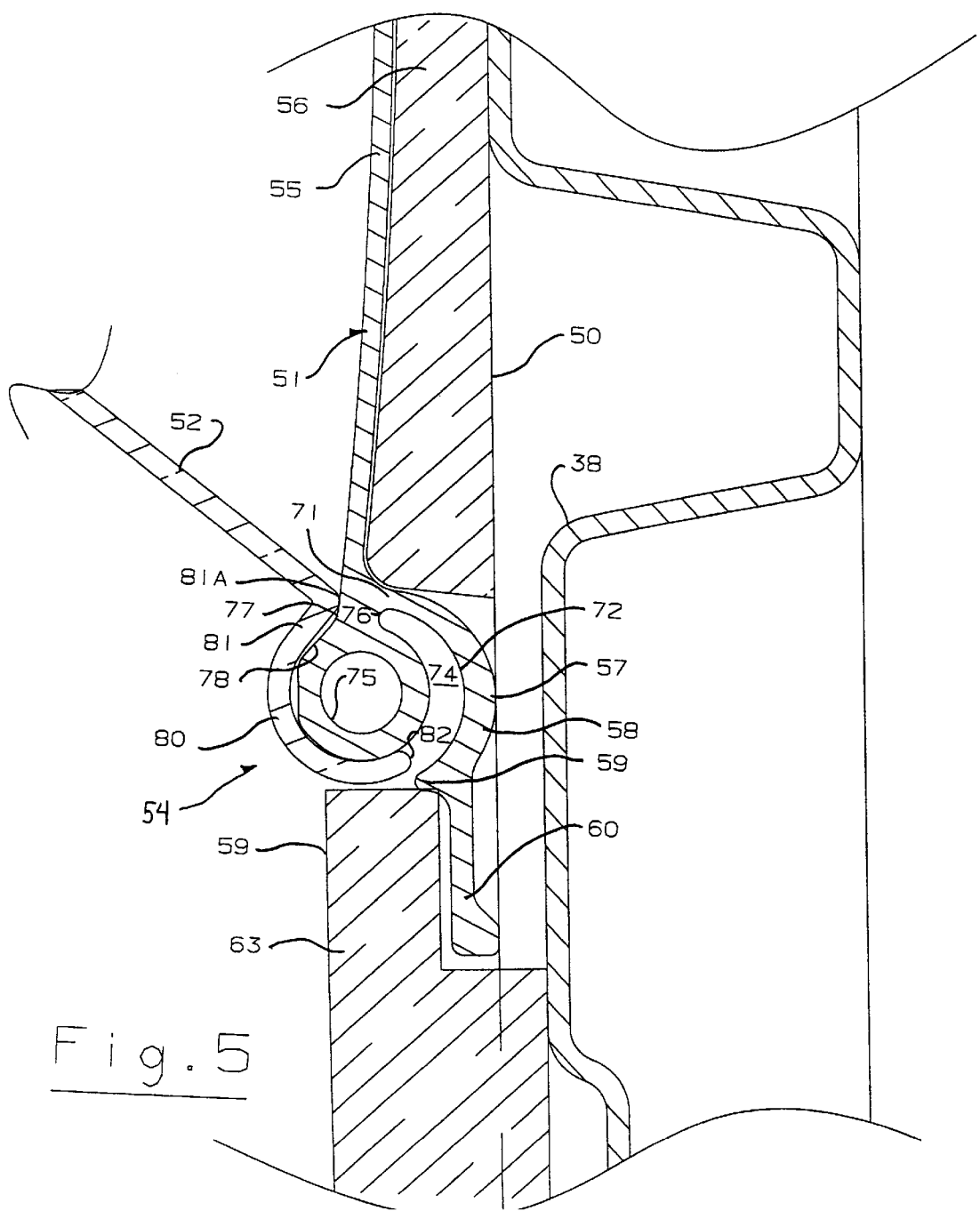
FIG. 5 is a cross sectional view taken similar to that of FIG. 2 on a further enlarged scale showing a detail of the hinge coupling between an impact panel and the cladding panel in a raised position of the impact panel for removal.

The panels 52 are molded from a flexible plastics material so that they form a side impact panel which is readily removable and replaceable in the event of minor damage. Removal is effected simply by removing the fastener 70 and by pivoting the panel upwardly so that it is released from the hinge 54A as described hereinafter. The panel 52 does not carry the insulation layer 62 which is instead bonded to and sealed against the shear plate so as to prevent cold air from getting behind the insulation layer. As best shown in FIG. 5, the part cylindrical section defined by the flange portion 58 extending from the lip 59 through to a junction 71 with the panel 55 defines a concave surface 72 which co-operates with the outside surface of a cylindrical bead 73 to define a part cylindrical channel 74. The bead 73 is formed as a hollow tube defining a hollow interior 75. The outside surface of the bead 73 is substantially cylindrical extending from a base 76 of the channel 74 through to a junction 77 with the panel 55. A flat section 78 is formed at the junction 77.

The panel 52 at its upper end includes a part cylindrical insert 80 which commences at a first portion 81 at right angles to the panel and extends therefrom rearwardly and then upwardly to define the part cylindrical insert terminating at an end 82. The part cylindrical insert 80 thus follows the path of the channel 74. The channel 74 is slightly tapered so that it becomes narrower toward the end 76 so that when the insert 80 is fully inserted into the channel 74 it is pinched and tight particularly adjacent the ends 76 and 82.

In a position shown in FIG. 2, therefore, the panel 52 is pivoted into its downward attached position where the insert 80 is fully extended into the channel 74. In its position the fastening at the bottom previously described can be effected to hold the panel in place.

When it is required to remove one of the panels 52 the fastenings at the bottom edge of the panel can be released and the panel pivoted upwardly to a position shown in FIG.

5. In this position the apex 81A of the junction 81 impacts upon the junction 77 and further rotational movement in the clockwise direction initiates rotation at the apex 81A thus releasing the end 82 from beneath the lowermost part of the cylindrical bead 73. Thus the insert 82 is popped out of the channel 74 and the panel can be simply removed by pulling away from the bottom edge of the panel 51.

Turning now to FIGS. 4A and 4B, there is shown in cross section two alternative arrangements for the junction between two of the panels 52 and it will be appreciated that each of the panels is identical so that the junction is identical between each panel and the next.

Thus each panel 52 has at its left hand end an inwardly turned right angle flange 84 which extends from the panel towards the side wall. The opposite end of the panel which is the right hand end as shown in FIG. 4A includes a similar in-turned right angle flange 86. Each of the flanges 84 and 86 has an edge surface butting in sealing engagement with a resilient sealing strip 87 provided at the base of a channel 88 in a strip 89 of insulation material mounted by adhesive 89A on the outside surface of the post 22. Each panel edge has a further sealing strip 90 located between the inside surface of the panel adjacent the flange and the outside surface of the strip 89. The flanges 84 and 86 are arranged such that they act to compress the strips 87 and 90 in a sealing effect. Thus the dual sealing arrangement prevents the penetration of moisture. In FIG. 4B is shown a modified arrangement in which the strips 87 and 90 are carried on a relatively stiff extruded channel member 91 mounted in a recess 91A in the insulation material. The channel member defines a central channel and two side flanges for carrying the strips 87 and 90 respectively.

At the ends of the panel as shown in FIG. 3, the insert 80 is arranged so that it overlaps without an increase in a thickness of the insert 80 at the overlap. Thus the insert 80 includes a portion 80A at the right hand end of the panel which is of half thickness and defines the outer surface 80B of the insert. Similarly a portion 80C at the left hand of the panel is of half thickness and defines the inside surface 80D of the insert. The portions 80A and 80C are of sufficient length so that there is room to accommodate expansion leaving overlapping portions which are of the reduced thickness. Thus when overlapped the insert portions 80A and 80C can be received within the recess 74 in the same pinching action as previously described. The length of the overlap and the flexibility of the panels is such that the panels can be moved apart to a position where the overlap is removed and each panel can then be individually pivoted to its removal position and removed without affecting the other remaining panels.

The cladding arrangement therefore provides a readily removable and replaceable impact panel which can be easily attached to and removed from the lower area of the side walls to provide an attractive appearance in a material that reduces the possibility of corrosion. However the simple flexible impact panel covers a sealed pan or sheer plate arrangement so that any damage which goes beyond minor contact with the impact panel is unlikely to cause penetration of the sealed sheer plate allowing the vehicle to remain in service since the passengers are fully protected by the sheer plate.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A public transit vehicle comprising:
    a roof,
    two side walls each extending longitudinally of the vehicle including an upper side wall portion connecting to the roof and a row of windows underneath the upper portion,
    a vehicle floor connected to the side walls and spanning therebetween;
    two rows of seats for seated passengers each along a respective one of the side walls at the windows and defining a central aisle therebetween for standing and moving passengers;
    a bottom frame portion having a plurality of longitudinal bottom rails underlying and supporting the floor including two bottom side rails each along a respective side of the floor at the respective side wall;
    and two side frame portions;
    each side frame portion having a plurality of side wall posts connected to a respective one of the bottom side rails and upstanding therefrom;
    and each side frame portion including a shear plate member welded along its bottom edge to the bottom side rail and to the side wall posts so as to extend continuously therebetween and extending continuously upwardly from the bottom edge to a top edge spaced downwardly from a bottom edge of the window, the shear plate member being formed with a plurality of horizontal stiffening elements therein so as to be resistant to impact thereon in a collision;
    each side wall including an exterior cladding structure covering the side frame portion, the cladding structure including a resilient covering panel covering at least a part of an outer surface of the shear plate member.

2. The vehicle according to claim 1 wherein the stiffening elements in the shear plate member are defined by horizontally extending vertically spaced bends in the shear plate member.

3. The vehicle according to claim 1 wherein the shear plate member located between each pair of posts comprises a single plate welded at its bottom edge to the bottom side rail and standing generally upwardly therefrom to form a generally vertical plate surface, at least one recessed band in the plate surface defined by four parallel horizontal bends and a top recessed channel portion defined by four parallel horizontal bends.

4. The vehicle according to claim 3 wherein said at least one band is shallower in horizontal depth than the channel portion.

5. The vehicle according to claim 1 wherein the exterior cladding structure includes a plurality of resilient covering panels arranged side by side along the length of the side wall.

6. The vehicle according to claim 5 wherein each of the resilient covering panels is mounted at its upper edge by a hinge coupling defined by a part cylindrical insert received within a part cylindrical recess allowing the resilient covering panel to be pivoted from a vertical covering position to a raised removal position at which it can be removed from the cladding structure and wherein the part cylindrical insert of each of the resilient covering panels overlaps with that of the next and is reduced in thickness at the overlap.

7. The vehicle according to claim 5 wherein the resilient covering panels each include along each side edge thereof an edge sealing member for engaging and effecting sealing engagement with an underlying sealing strip, the side edge of each panel being adjacent to and spaced from that of the next panel to allow removal of each panel without affecting the next panels.

8. The vehicle according to claim 7 wherein the edge sealing member of each resilient covering panel comprises a rearwardly turned flange having a rearmost edge surface for engaging the sealing strip and a resilient sealing bead on a rear surface of the panel adjacent the flange.

9. The vehicle according to claim 1 wherein the exterior cladding structure includes a cladding panel above the top edge of the resilient covering panel and below the bottom edge of the windows.

10. The vehicle according to claim 9 wherein the cladding panel is substantially continuous along the vehicle.

11. The vehicle according to claim 10 wherein the resilient covering panel is mounted at its upper edge to the cladding panel by a hinge coupling defined by a part cylindrical insert received within a part cylindrical recess allowing the resilient covering panel to be pivoted from a vertical covering position to a raised removal position at which it can be removed from the cladding structure.

12. The vehicle according to claim 11 wherein the part cylindrical recess is provided on the cladding panel.

13. The vehicle according to claim 11 wherein the part cylindrical recess is tapered toward a bottom end to compress the part cylindrical insert in the vertical covering position.

14. The vehicle according to claim 11 wherein the part cylindrical recess is defined on its concave side by a generally cylindrical bead member.

15. The vehicle according to claim 11 wherein the part cylindrical recess and the part cylindrical insert are arranged such that rotation to the raised removal position tends to cause the insert to be levered out of the recess.

16. The vehicle according to claim 1 wherein there is provided a layer of foam insulation carried between the shear plate and the resilient covering panel.

17. The vehicle according to claim 1 wherein the resilient covering panel is connected by a plurality of spaced fasteners to the bottom side rail.

18. The vehicle according to claim 1 wherein the bottom side rail includes a recessed surface below the bottom of the shear plate member and wherein the resilient covering panel includes an in-turned bottom portion for fastening to the recessed surface.

19. A public transit vehicle comprising:
a roof,
two side walls each extending longitudinally of the vehicle including an upper side wall portion connecting to the roof and a row of windows underneath the upper portion,
a vehicle floor connected to the side walls and spanning therebetween;
two rows of seats for seated passengers each along a respective one of the side walls at the windows and defining a central aisle therebetween for standing and moving passengers;
each side wall including an exterior cladding structure including a resilient covering panel covering at least a part of an outer surface of the side wall;
wherein the resilient covering panel is mounted at its upper edge by a hinge coupling defined by a part cylindrical insert received within a part cylindrical recess allowing the resilient covering panel to be pivoted from a vertical covering position to a raised removal position at which it can be removed from the cladding structure.

20. The vehicle according to claim 19 wherein the exterior cladding structure includes a plurality of resilient covering panels arranged side by side along the length of the side wall.

21. The vehicle according to claim 20 wherein each of the resilient covering panels includes a respective part cylindrical insert which overlaps with that of the next and is reduced in thickness at the overlap.

22. The vehicle according to claim 20 wherein the resilient covering panels each include along each side edge thereof an edge sealing member for engaging and effecting sealing engagement with an underlying sealing strip, the side edge of each panel being adjacent to and spaced from that of the next panel to allow removal of each covering panel without affecting the next covering panels.

23. The vehicle according to claim 22 wherein the edge sealing member of each resilient covering panels comprises a rearwardly turned flange having a rearmost edge surface for engaging the sealing strip and a resilient sealing bead on a rear surface of the panel adjacent the flange.

24. The vehicle according to claim 19 wherein the exterior cladding structure includes a cladding panel above the top edge of the resilient covering panel and below the bottom edge of the windows with the resilient covering panel attached to the cladding panel by the hinge coupling.

25. The vehicle according to claim 24 wherein the cladding panel is substantially continuous along the vehicle.

26. The vehicle according to claim 24 wherein the part cylindrical recess is provided on the cladding panel.

27. The vehicle according to claim 19 wherein the part cylindrical recess is tapered toward a bottom end to compress the part cylindrical insert in the vertical covering position.

28. The vehicle according to claim 19 wherein the part cylindrical recess is defined on its concave side by a generally cylindrical bead member.

29. The vehicle according to claim 19 wherein the part cylindrical recess and the part cylindrical insert are arranged such that rotation to the raised removal position tends to cause the insert to be levered out of the recess.

30. The vehicle according to claim 19 wherein the resilient covering panel is connected by a plurality of spaced fasteners to a bottom side rail.

31. A public transit vehicle comprising:
a roof,
two side walls each extending longitudinally of the vehicle including an upper side wall portion connecting to the roof and a row of windows underneath the upper portion,
a vehicle floor connected to the side walls and spanning therebetween;
two rows of seats for seated passengers each along a respective one of the side walls at the windows and defining a central aisle therebetween for standing and moving passengers;
each side wall including an exterior cladding structure including:
a plurality of resilient covering panels arranged side by side along the length of the side wall covering a lower part of an outer surface of the side wall;
and a cladding panel which is substantially continuous along the vehicle arranged above the top edge of the resilient covering panels and below the bottom edge of the windows so as to cover a part of the outer surface of the side wall above said lower part.

32. The vehicle according to claim 31 wherein the resilient covering panels each include along each side edge thereof an edge sealing member for engaging and effecting sealing engagement with an underlying sealing strip, the side edge of each panel being adjacent to and spaced from that of a next adjacent panel to allow removal of each panel without affecting the next adjacent panels.

33. The vehicle according to claim 32 wherein the edge sealing member of each resilient covering panels comprises a rearwardly turned flange having a rearmost edge surface for engaging the sealing strip and a resilient sealing bead on a rear surface of the panel adjacent the flange.

34. The vehicle according to claim 20 wherein each of the resilient covering panels is connected by a plurality of spaced fasteners to a bottom side rail.

\* \* \* \* \*